(12) United States Patent
Ellis et al.

(10) Patent No.: US 9,128,531 B2
(45) Date of Patent: Sep. 8, 2015

(54) OPERAND SPECIAL CASE HANDLING FOR MULTI-LANE PROCESSING

(75) Inventors: Sean Tristram Ellis, Farnham (GB); Simon Alex Charles, Cambridge (GB); Andrew Burdass, Ely (GB)

(73) Assignee: ARM Limited, Cambridge (GB)

( * ) Notice: Subject to any disclaimer, the term of this patent is extended or adjusted under 35 U.S.C. 154(b) by 626 days.

(21) Appl. No.: 13/402,280

(22) Filed: Feb. 22, 2012

(65) Prior Publication Data

US 2013/0219149 A1    Aug. 22, 2013

(51) Int. Cl.
*G06F 15/00* (2006.01)
*G06F 15/76* (2006.01)
*G06F 9/02* (2006.01)
*G06F 9/38* (2006.01)

(52) U.S. Cl.
CPC .............. *G06F 9/02* (2013.01); *G06F 9/3873* (2013.01); *G06F 9/3887* (2013.01)

(58) Field of Classification Search
None
See application file for complete search history.

(56) References Cited

U.S. PATENT DOCUMENTS

| | | | |
|---|---|---|---|
| 5,058,048 A * | 10/1991 | Gupta et al. | 708/508 |
| 6,321,327 B1 * | 11/2001 | Makineni et al. | 712/222 |
| 6,460,134 B1 * | 10/2002 | Blomgren et al. | 712/219 |
| 6,629,231 B1 * | 9/2003 | Lohman | 712/1 |
| 6,691,223 B1 * | 2/2004 | Ganesan et al. | 712/244 |
| 2006/0179198 A1 * | 8/2006 | Inoue et al. | 710/260 |
| 2009/0327665 A1 * | 12/2009 | Sperber et al. | 712/222 |
| 2013/0138925 A1 * | 5/2013 | Hickey et al. | 712/214 |

* cited by examiner

*Primary Examiner* — George Giroux
(74) *Attorney, Agent, or Firm* — Nixon & Vanderhye P.C.

(57) ABSTRACT

A single instruction multiple data processing pipeline 12 for processing floating point operands includes shared special case handling circuitry 34 for performing any operand dependent special case processing operations. The operand dependent special case processing operations result from special case conditions such as operands that are denormal, an infinity, a not-a-number and a floating point number requiring format conversion. The pipeline 12 may in some embodiments be stalled while the operands requiring special case processing are serially shifted to and from the shared special case handling circuitry 34. In other embodiments the instruction in which the special case condition for an operand arose may be recirculated through the pipeline with permutation circuitry 86, 94 being used to swap the operands between lanes in order to place the operand(s) requiring special case processing operations into the lane containing the shared special case handling circuitry 98.

17 Claims, 6 Drawing Sheets

OPERAND SPECIAL CASE HANDLING FOR MULTI-LANE PROCESSING

BACKGROUND OF THE INVENTION

1. Field of the Invention

This invention relates to the field of data processing systems. More particularly, this invention relates to data processing systems including a plurality of lanes of processing circuitry which perform processing operations in parallel with each other, for example, single instruction multiple data (SIMD) processing systems.

2. Description of the Prior Art

It is known to provide data processing systems which incorporate a plurality of processing lanes for performing in parallel data processing operations upon respective operands. An example of such a system is a SIMD system, but other examples include other forms of vector processor and special purpose processors, such as those which may be used to extract pixel values from texture maps within graphics processing units. An advantageous feature of such processing systems including a plurality of lanes of processing circuitry is that high levels of data throughput may be achieved, e.g. individual colour component values for pixels may be processed in parallel rather than having to be processed separately in series. It is often, but not always, the case that the processing operation performed is the same for each of the lanes of processing circuitry. A disadvantage of systems employing a plurality of lanes of processing circuitry is that the circuit area consumed by the processing circuits can be large resulting in an increase in cost, complexity, power consumption and the like.

An issue that arises in the above systems is that operand dependent special case conditions (not opcode dependent) may arise which require special case processing operations to be performed within the lanes of processing circuitry. Examples of such operand dependent special case conditions in the context of processing floating point numbers are if any of the operands being processed are denormal operands, not-a-number (NaN) operands, operands requiring formal conversion (especially narrowing conversions) and the like. In order to deal with the special case processing operations which can arise in any of the plurality of lanes of processing circuitry, one approach is to provide special case handling circuits within each of the plurality of lanes of processing circuitry. Each of these special case handling circuits can then deal with any special case conditions arising for the operands being processed within its lane of processing circuitry. A problem with this approach is that the special case handling circuits add circuit area, cost and complexity to the overall system. These special case handling circuits are present within each of the plurality of lanes of processing circuitry thereby increasing the effect they have on the overall system circuit area. While these special case handling circuits may be necessary to perform required special case processing operations, such special case processing operations are relatively rare in normal processing. This has the consequence of the special case handling circuits consuming a relatively high circuit area to provide functionality that is rarely used.

Another approach is to support the special case processing operations in software when they arise. This is disadvantageously slow.

SUMMARY OF THE INVENTION

Viewed from one aspect the present invention provides an apparatus for processing data having data processing pipeline hardware, said data processing pipeline hardware comprising:

a plurality of lanes of processing circuitry configured to perform data processing operations in parallel upon operands within respective ones of said plurality of lanes of processing circuitry;

a plurality of special case detecting circuits, each coupled to a respective one of said plurality of lanes of processing circuitry and configured to detect in parallel a respective special case condition if one or more of said operands processed by said lane of processing circuitry matches any of one or more predetermined conditions; and one or more shared special case handling circuits each coupled to a plurality of said plurality of special case detecting circuits and configured to perform in series a respective special case processing operation for a special case condition detected within any of a plurality of said plurality of lanes of processing circuitry.

The present technique recognises that the performance of the special case handling circuits in terms of how quickly they can perform required special case handling operations need not be high since such special case processing operations are rarely required. Accordingly, the present technique recognises that an advantageous balance between circuit area overhead and performance may be achieved by the provision of one or more shared special case handling circuits each serving to perform any necessary special case processing operations in respect of a plurality of lanes of processing circuitry rather than providing a dedicated special case handling circuit for each of the lanes of processing circuitry. Sharing the special case handling circuits between the plurality of lanes of processing circuitry impacts the speed with which special case processing operations may be performed, but the benefit in terms of the reduced circuit area more than outweighs this speed penalty. The shared special case handling circuits are quicker than the software approach for special case processing.

It will be appreciated that the data processing pipeline hardware could have a variety of different forms. The data processing pipeline hardware includes a plurality of lanes of processing circuitry. The data processing pipeline hardware could, for example, be a general purpose vector processing pipeline or a special purpose pipeline having a plurality of lanes of processing circuitry, such as the type of pipeline used within graphics processors for special purposes such as texture mapping. However, the present technique is particularly well suited for use in embodiments where the data processing pipeline hardware is single instruction multiple data processing pipeline hardware. Such SIMD pipelines may be wide and replicated many times within a system and accordingly a saving in the circuit area associated with special case handling circuits is particularly advantageous.

The special case conditions detected can take a variety of different forms. In some circumstances, a special case condition may be one in which an operand value was uncached, resulted in a divide by zero operation or some other non-standard condition that required processing different from the normal processing supported by the pipeline hardware. When the operands are floating point operands there are a number of particular special case conditions which can arise that require special case processing operations to be performed and accordingly require special case handling circuits to be provided. Special case conditions associated with floating point operands may be when the floating point operand is one of a denormal floating point number, an infinity, a not-a-number; or a floating point number requiring format conversion. Whilst relatively rare in normal well-formed processing, such special case conditions can arise and should be handled properly without a significant impact upon overall performance.

It will be appreciated that an alternative approach to the provision of special case handling circuits within the data processing pipeline hardware would be to use software techniques to perform required special case processing operations. For example, the special case detecting circuits could detect the special case conditions and then raise an exception which caused software to perform any required special case processing operations so as to fix up the result in the required perform. However, such software based mechanisms for supporting special case processing operations have an unacceptably high impact upon the processing performance of the pipeline hardware as the pipeline hardware may be stalled for many thousands of processing cycles whilst such software based special processing operations are performed. The present technique is a hardware based technique which balances the circuit overhead associated with the special case handling circuits against the performance necessary to undertake any required special case processing operations in an acceptable time.

It will be appreciated that in some embodiments, the data processing pipeline hardware may incorporate multiple shared special case handling circuits with each of these special case handling circuits being responsible for a subset of the plurality of lanes of processing circuitry. For example, two special case handling circuits could be provided with each of these special case handling circuits being responsible for performing special case processing operations in respect of any special case conditions detected for the operands within their respective half of the plurality of lanes of processing circuitry. However, in most cases an appropriate balance between circuit area and special case processing operation performance may be achieved when a single shared special case handling circuit is provided in respect of a given instance of multilane data processing pipeline hardware. In this case, the single shared special case handling circuit is responsible for any special case condition detected within any of the plurality of lanes of processing circuitry making up that pipeline hardware.

There are a number of different possibilities for the way in which the sharing of the special case handling circuits may be achieved. In some embodiments, the one or more shared special case handling circuits may be configured to stall the data processing pipeline when one or more special case conditions are detected, then serially to perform respective special case processing operations for those one or more special case conditions that have been detected and then, when all of the necessary special case processing operations have been completed, to unstall the data processing pipeline hardware. This approach is relatively simple to implement and requires little additional storage of state while the special case processing operations are undertaken.

If register slices in the pipeline are accessible, then these can be used for the storage of inputs and outputs to the special case processing operations and may be configured as shift registers to perform shift operations to provide input operands to the shared special case handling circuits and to receive output operands from the shared special case handling circuits when the necessary special case handling processing operations have been performed.

A disadvantage of this simple stalling approach is that all of the other instructions within the data processing pipeline hardware will be stalled until the special case processing operations have all completed and this has an impact upon processing throughput.

Data processing pipeline hardware of the form incorporating a plurality of lanes of processing circuitry often includes permutation circuitry configured to swap operands between processing lanes. Such permutation circuitry is normally provided for reasons separate from any requirement to perform special case processing operations and is utilised during the normal operations of the pipeline (such as swizzle operations). Such permutation circuitry may be conveniently reused to support the present techniques by swapping operands from a processing lane in which a special case condition has been detected into a processing lane that contains one of the special case handling circuits. Thus, each processing lane need not contain a special case handling circuit, but nevertheless operands requiring special case processing operations to be performed can be routed to that special case handling circuit using the permutation circuitry already provided.

In this context, a convenient way of handling the sharing of the special case handling circuits between processing lanes is to provide recirculation of instructions in which special case conditions have been detected. By recirculating such instructions and with the help of the permutation circuitry directing operands requiring special case processing operations to the provided special case handling circuits, it is possible to perform the required special case processing operations spread over multiple passes through the pipeline. In this way, the pipeline hardware need not be stalled and can continue to those process instructions in which case no special case condition operands have been detected, thereby resulting in a reduced impact on processing operations.

The recirculating instructions could be recirculated around the entire pipeline, with appropriate additional state bits to indicate which lane of the result requires special case processing operations. Such an approach may require partial results to be stored in architectural registers. Another approach would be to recirculate the instruction within a single lane of the pipeline with appropriate additional state bits (stored locally) to indicate which lane of the result requires the special case processing at each pass through the pipeline. This may pose fewer operand storage issues, but still requires control logic to recirculate results back to the top of the pipeline.

The data processing pipeline hardware may include a plurality of accumulation registers configured to store operands in which no special case condition has been detected and operands output from the special case processing until recirculation operations corresponding to all detected parallel special case conditions have completed. This simplifies support of the circulation approach as overwriting of architectural registers may be avoided whilst special case processing operations are pending.

When accumulation registers are used in this way, the contents of these accumulation registers may be moved into the result registers (architectural registers) when recirculation operations have all completed.

In order to reduce power consumption, those processing lanes not containing any of the one or more shared special case handling circuits may be held inactive during the one or more recirculation operations.

Viewed from another aspect the present invention provides an apparatus for processing data having data processing pipeline means for processing data, said data processing pipeline means comprising:

a plurality of lanes of processing means for performing data processing operations in parallel upon operands within respective ones of said plurality of lanes of processing means;

a plurality of special case detecting means for detecting special cases, each coupled to a respective one of said plurality of lanes of processing means and configured to detect in parallel a respective special case condition if one or more of said operands processed by said lane of processing means matches any of one or more predetermined conditions; and one or more shared special case handling means for performing special case handling each coupled to a plurality of said plurality of special case detecting circuits and configured to perform in series a respective special case processing operation for a special case condition detected within any of a plurality of said plurality of lanes of processing means.

Viewed from a further aspect the present invention provides a method of processing data within data processing pipeline hardware comprising the steps of:

performing data processing operations in parallel upon operands within respective ones of a plurality of lanes of processing circuitry;

detecting in parallel a respective special case condition if one or more of said operands processed by a lane of processing circuitry matches any of one or more predetermined conditions; and perform in series with one or more shared special case handling circuits a respective special case processing operation for a special case condition detected within any of a plurality of said plurality of lanes of processing circuitry.

The above, and other objects, features and advantages of this invention will be apparent from the following detailed description of illustrative embodiments which is to be read in connection with the accompanying drawings.

DESCRIPTION OF THE EMBODIMENTS

Figure 1:
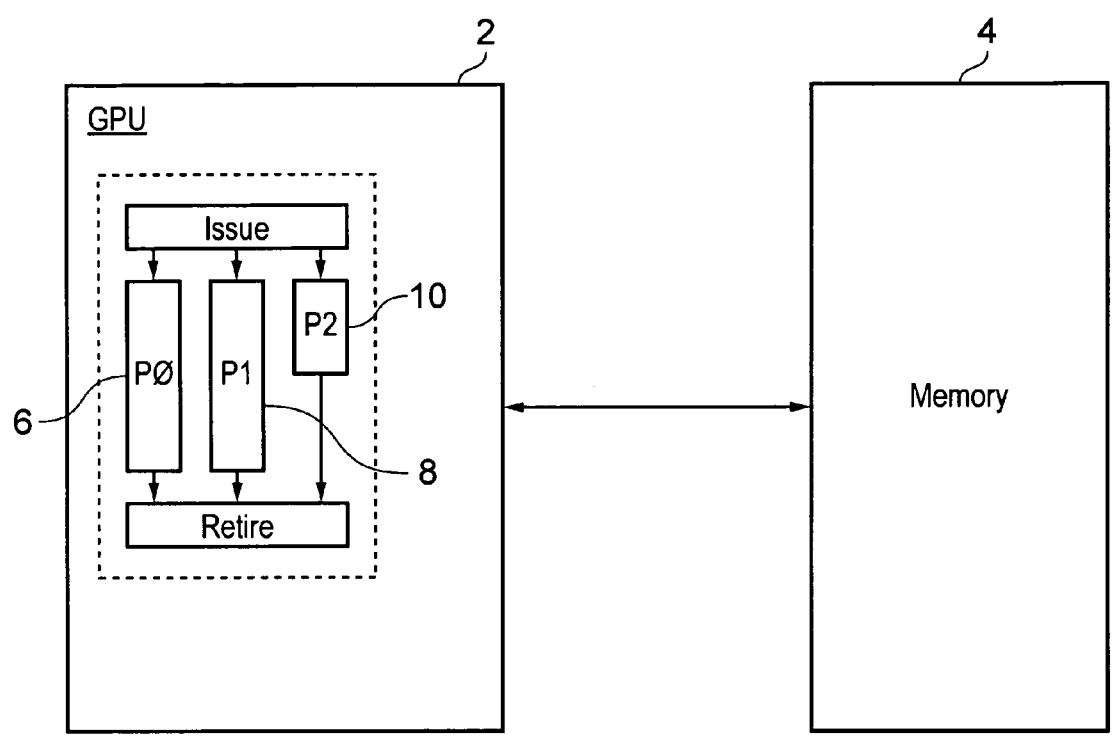
FIG. 1 schematically illustrates a graphics processing unit including a plurality of data processing pipeline hardware elements.

FIG. 1 schematically illustrates a graphics processing unit 2 coupled to a memory 4, which may contain program instructions for controlling the graphics processing unit 2 as well as data to be processed by the graphics processing unit 2. Within the graphics processing unit 2 there are provided a plurality of data processing pipelines 6, 8, 10 into which program instructions may be issued and from which program instructions may subsequently be retired. Each of these pipelines 6, 8, 10 can have a different specialisation. For example, individual pipelines may be scalar arithmetic pipelines, load/store pipelines or other forms of pipeline. One particular form of data processing pipeline hardware which may be supported within such a graphics processing unit 2 is a single instruction multiple data processing pipeline in which the operands are floating point operands. The floating point operands may have a form such as that set out in the IEEE 754-2008 specification. This specification includes a number of special cases for representing numbers outside the usual range. When operands falling within one of these special cases are detected within the SIMD floating point operand pipeline, then special case processing operations need to be performed. Examples of floating point numbers having forms matching predetermined conditions requiring special case processing operations include a denormal floating point, an infinity, a not-a-number and a floating point number requiring format conversion (particularly a narrowing conversion).

Figure 2:
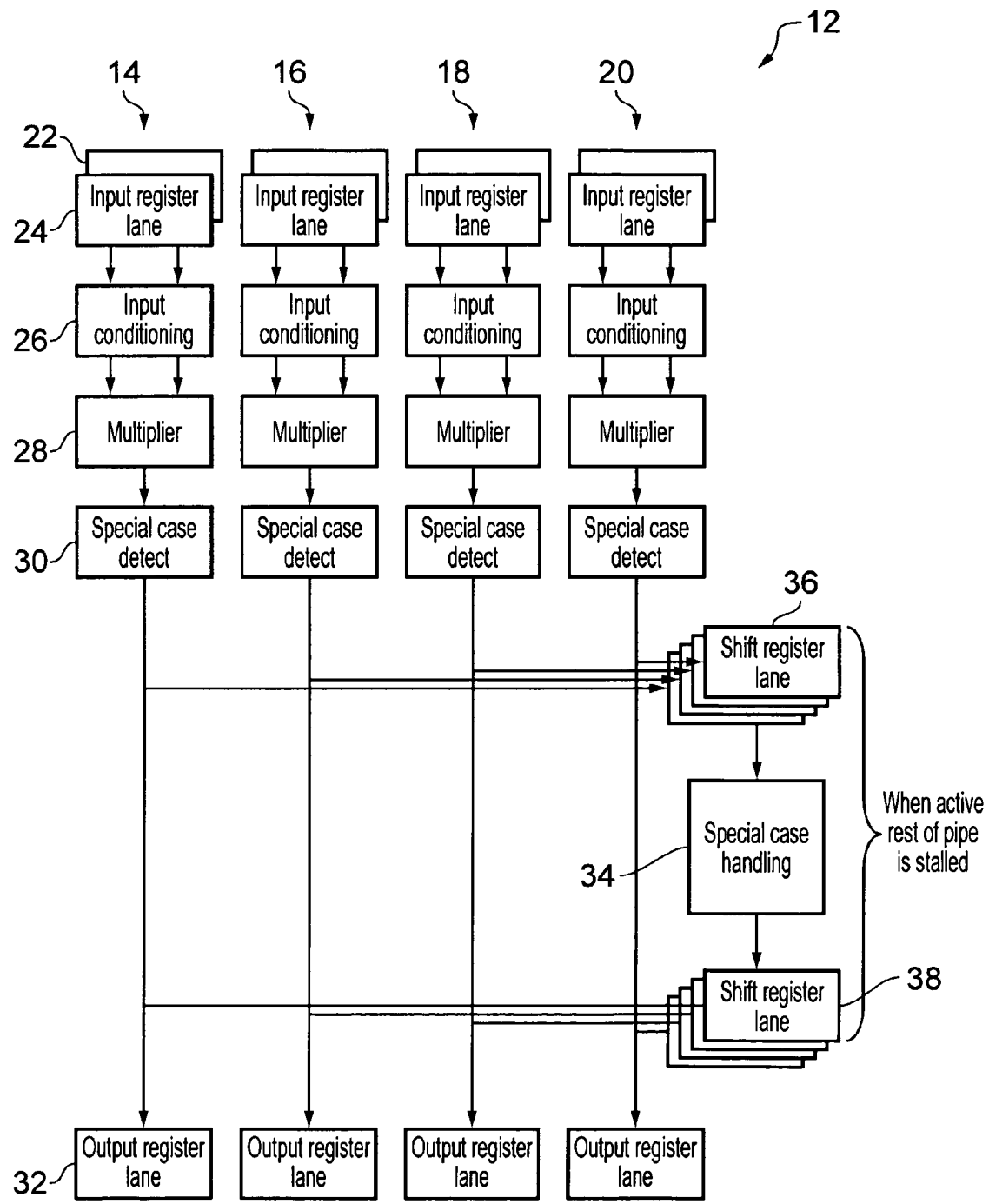
FIG. 2 schematically illustrates a first example embodiment incorporating shared special case handling circuitry where the pipeline is stalled when special case processing operations are required.

FIG. 2 schematically illustrates a first example embodiment of a SIMD pipeline 12 including a plurality of lanes of processing circuitry 14, 16, 18, 20. Each of these lanes of processing circuitry includes a plurality of input registers 22, 24, input conditioning circuitry 26, a multiplier 28, a special case detecting circuit 30 and an output register 32. The input registers 22, 24, the input conditioning circuitry 26, the multiplier 28 and the output register 32 may be conventional and will be familiar to those in this technical field.

The special case detecting circuit 30 serves to detect matches between the operands being processed (e.g. the output of the multiplier 28) and one or more predetermined conditions. These predetermined conditions are ones where special case processing is required in order that the operand can be properly represented as a desired, e.g. denormal floating point number, an infinity, a non-a-number or a floating point number for which a format conversion has been performed. Such special case processing operations are performed by a shared special case handling circuit 34. A single shared special case handling circuit 34 is shared between all four of the lanes of processing circuitry 14, 16, 18, 20. In other embodiments, it is possible that, for example, two special case handling circuits could be provided with each being responsible for two of the four lanes of processing circuitry 14, 16, 18, 20.

In this embodiment, when a special case condition is identified, then the entire pipeline 12 is stalled until the necessary special case processing operations have been completed. The operands in which the special case conditions had been identified are transferred to the input of the shared special case handling circuitry 34 using registers configured as shift registers 36 for this mode of operation. These registers may also function as the normal registers which hold the operands when no special case conditions have been identified and shifting operation is not needed to the shared special case handling circuit 34.

The shared special case handling circuit 34 serially performs respective special case processing operations for the one or more special case conditions that have been identified. The resulting operands that have been subject to special case processing operations stored into registers 38 for shifting back into their appropriate lane of processing circuitry. When all of the detected special case conditions have been subject to the required special case processing operations by the shared special case handling circuit 34, then the pipeline 12 is unstalled and normal processing operations may resume.

Figure 3:
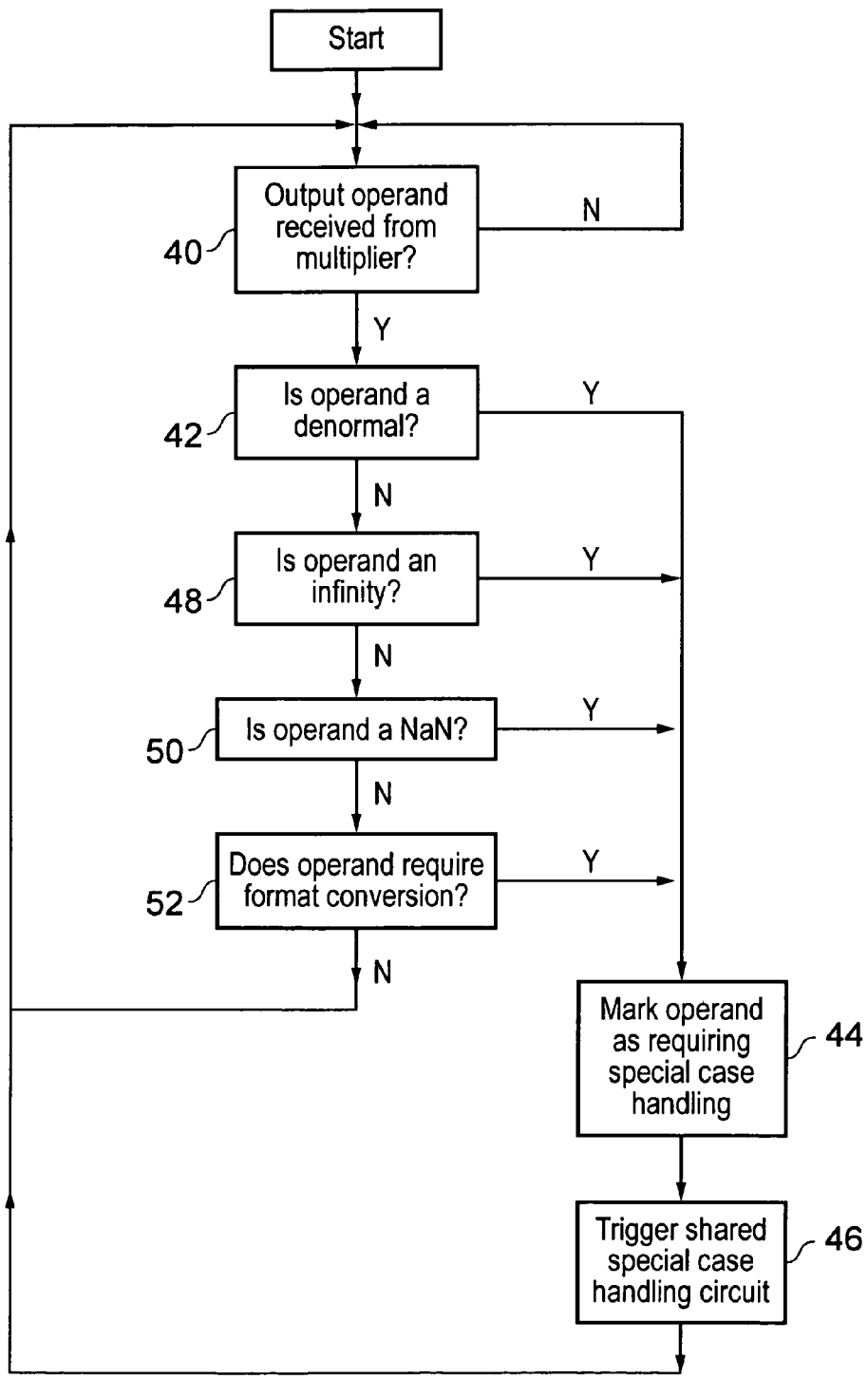
FIG. 3 is a flow diagram schematically illustrating special case detection.

FIG. 3 is a flow diagram schematically illustrating special case detection which may be performed by the special case detecting circuitry 30. At step 40, processing waits until an output operand is received from the multiplier 28. Step 42 determines whether or not the operand is a denormal. If the operand is a denormal, then processing proceeds to step 44 where the operand is marked as requiring special case handling and then step 46 serves to trigger special case processing operations to be performed by the shared special case handling circuit 34 together with any other operands requiring such special case processing operations from other lanes within the pipeline 12.

If the determination at step 42 is that the operand is not a denormal, then processing proceeds to step 48 where a determination is made as to whether or not the operand is an infinity. If the operand is an infinity, then processing proceeds to step 44. If the operand is not an infinity, then processing proceeds to step 50.

At step 50 a determination is made as to whether or not the operand is a not-a-number operand. If the operand is a not-a-number operand, then processing proceeds to step 44. If the operand is not a non-a-number operand, then processing proceeds to step 52.

At step 52 a determination is made as to whether or not the operand requires format conversion. If the operand does require format conversion, the processing proceeds to step 44. If the operand does not require format conversion, then the processing returns to step 40.

Figure 4:
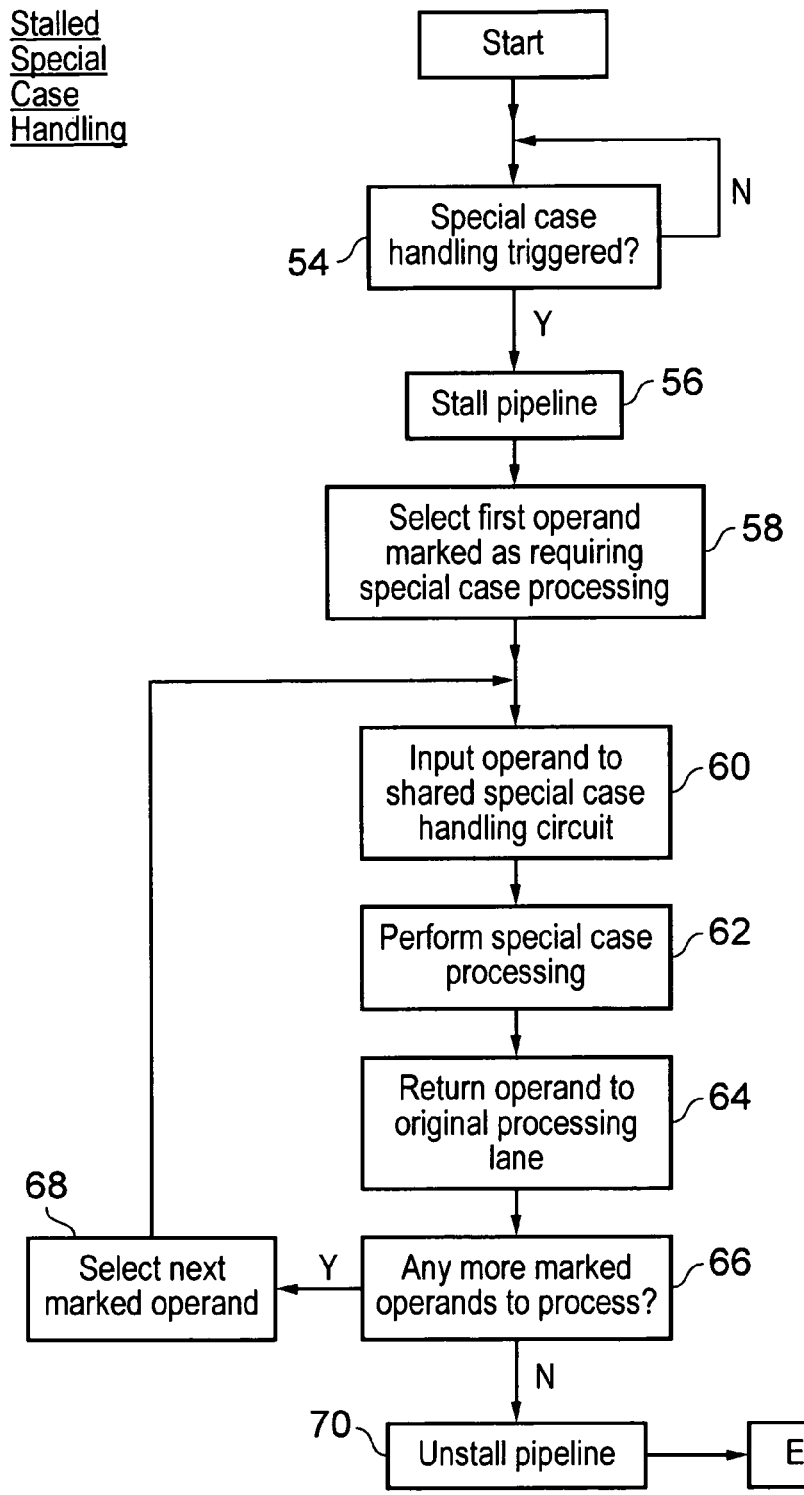
FIG. 4 is a flow diagram schematically illustrating special case handling for the embodiment of FIG. 2.

FIG. 4 is a flow diagram schematically illustrating the operation of the pipeline of FIG. 2 in performing stalled special case handling. At step 54, processing waits until special case handling is triggered. Step 56 stalls the pipeline 12. Step 58 selects the first operand marked as requiring special case processing. Step 60 inputs the selected operand to the shared special case handling circuit 34 with any required change of position being achieved using the shift registers 36. At step 62, the shared special case handling circuit 34 performs the required special case processing. Step 64 returns the operand to its original processing lane. At step 66 a determination is made as to whether or not there are any more operands marked as requiring special case processing that have not already been subject to such special case processing. If there are any such operands, then step 68 selects the next of these marked operands and processing proceeds to step 60. If all of the operands requiring special case processing have undergone special case processing by the shared special case handling circuit 34, then processing proceeds from step 66 to step 70 where the pipeline 12 is unstalled.

Figure 5:
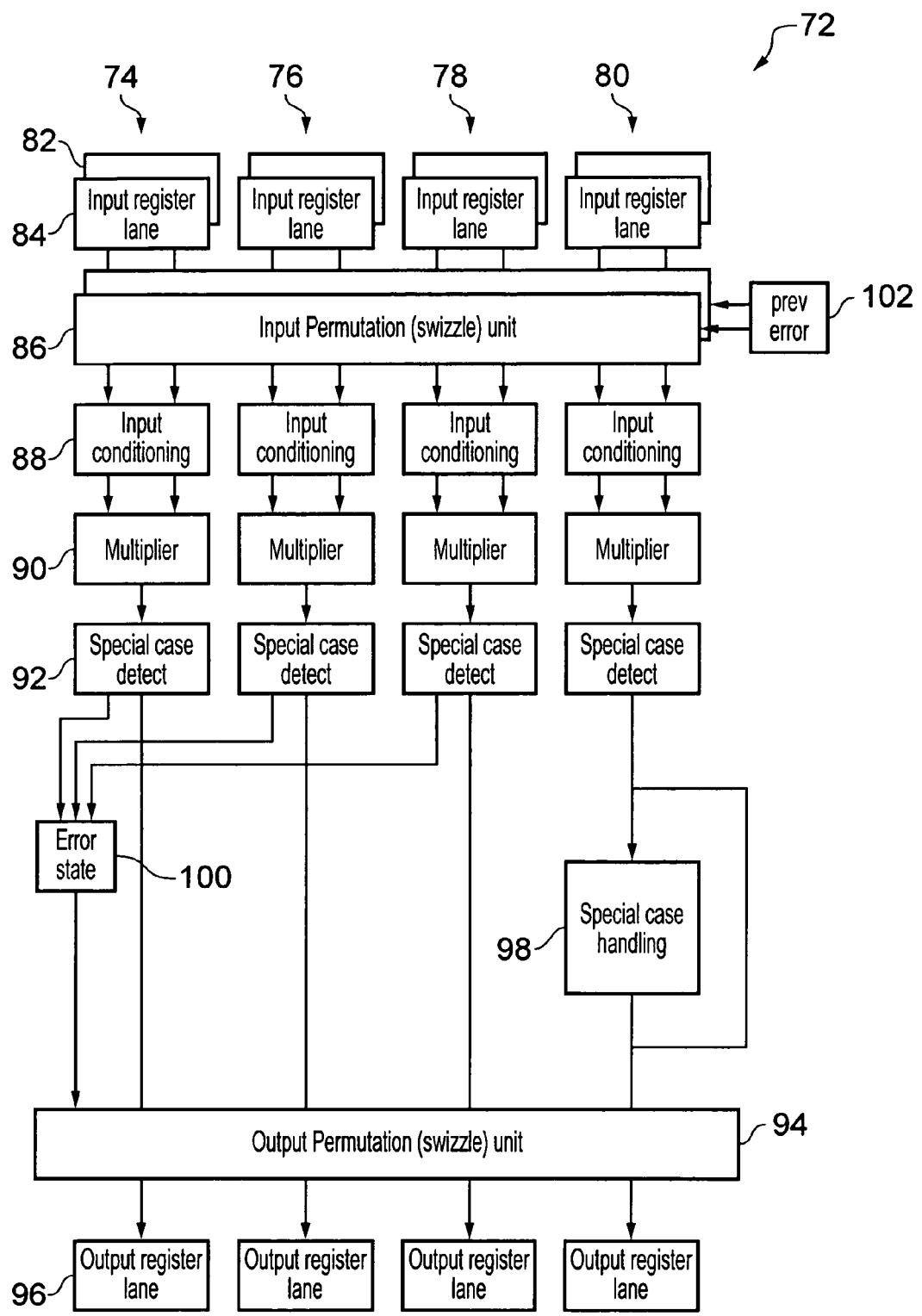
FIG. 5 is a second example embodiment in which a recirculation technique is employed to perform any necessary special case processing operations.

FIG. 5 schematically illustrates a second example embodiment of data processing pipeline hardware 72 in the form of a single instruction multiple data pipeline for performing parallel processing operations upon floating point operand data. The pipeline 72 incorporates a plurality of lanes of processing circuitry 74, 76, 78, 80. Each of these lanes of processing circuitry 74, 76, 78, 80 incorporates input registers 82, 84, input permutation circuitry 86, input conditioning circuitry 88, a multiplier 90, special case detection circuitry 92, output permutation circuitry 94 and an output register 96. The permutation circuitry 86, 94 serves to support swizzle operations in which operands may be moved/swapped between the lanes of processing circuitry 74, 76, 78, 80 both at the input end of the pipeline and at the output end of the pipeline. Such permutation operations will be familiar and are useful during normal processing within SIMD pipelines.

In the embodiment of FIG. 5, only the lane of processing circuitry 80 includes the shared special case handling circuit 98. If a special case condition is detected within the lane of processing circuitry 80, then it may be subject to required special case processing operations as it passes through the shared special case handling circuitry 98. If a special case condition is detected in one of the other lanes of processing circuitry 74, 76, 78, then these do not contain the shared special case handling circuit 90 and have no way of supplying their operands to the shared special case handling circuitry 98 during the current pass of the instruction to the pipeline 72. Error state recording circuit 100 notes the occurrence of such special case conditions arising in any of the lanes of processing circuitry 74, 76, 78.

If such special case conditions arise in any of the lanes 74, 76, 78, then the instruction is recirculated back through the pipeline 72. Previous error circuitry 102 records in which lanes 74, 76, 78 special case conditions arose during the previous pass of that instruction through the pipeline 72 and directs the input permutation circuitry 86 to swap the operands for a lane in which a special case condition arose into the lane 80. When those operands in which the special condition arose pass through the lane 80 they will be subject to special case processing operations by the shared special case handling circuitry 98 before being swapped back to their original lane position by the output permutation circuitry 94. The instruction can be recirculated however many times is necessary in order for all of the special case conditions which arose in any of the lanes 74, 76, 78 to be subject to required special case processing operations.

In this embodiment the pipeline 72 is not stalled and the recirculation action introduces processing bubbles (pipeline stages that would normally have another instruction in them, but are instead used to recirculate the instruction requiring special case handling) into the pipeline 72 to support the additional passes of the recirculating instruction through the pipeline 72.

In some embodiments, during recirculation, those lanes of processing circuitries 74, 76, 78 which are not being used to pass through an operand to the shared special case handling circuitry 98 may be held inactive in order to save power.

The output registers 76 may include accumulation registers and result registers. When recirculation is being performed, then output operands may be stored into the accumulation registers. Only when any necessary recirculation has been completed may the operand values be copied from the accumulation registers into the result registers for output from the pipeline 72.

Figure 6:
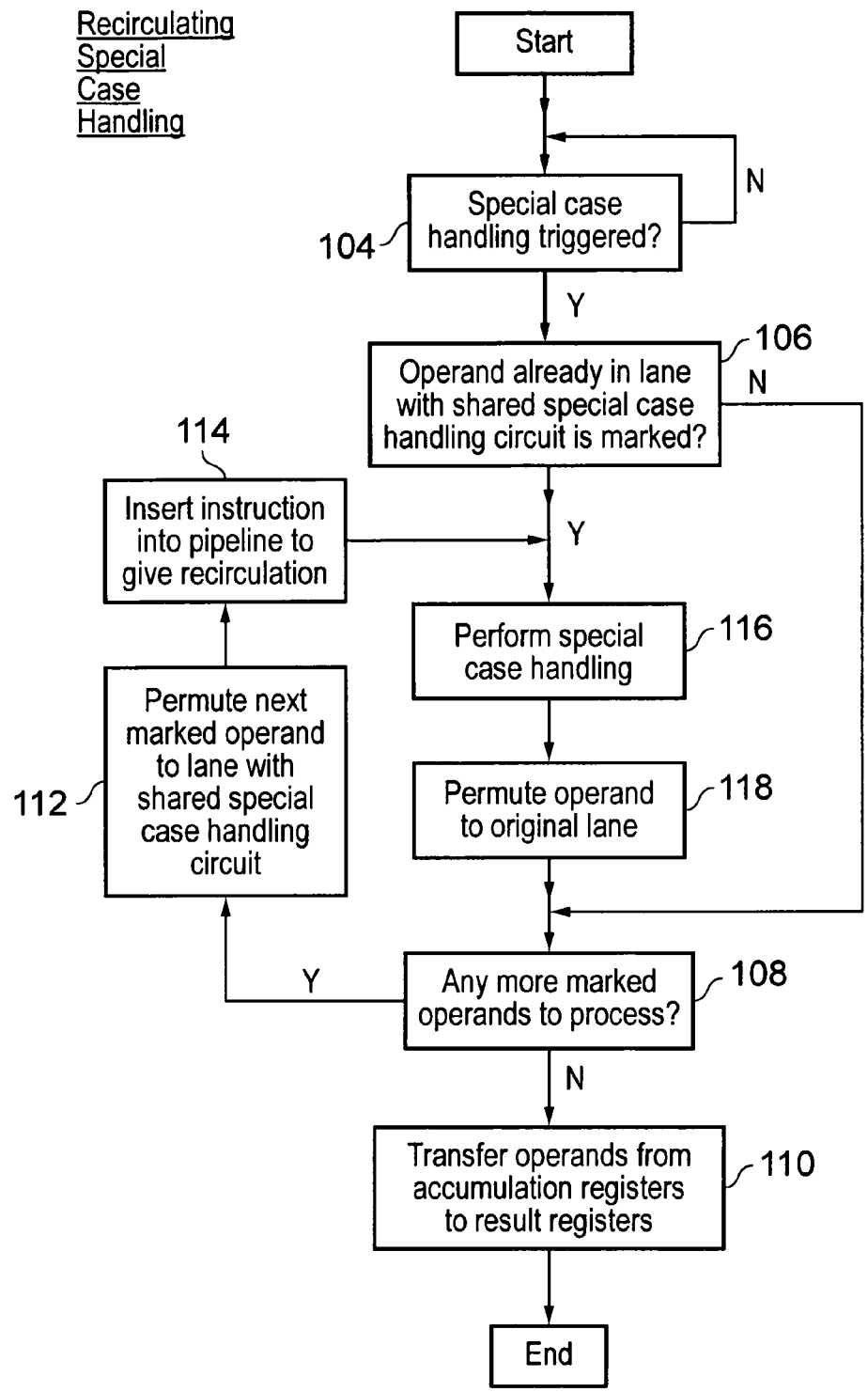
FIG. 6 is a flow diagram schematically illustrating recirculating special case handling processing as performed by the embodiment of FIG. 5.

FIG. 6 is a flow diagram schematically illustrating the recirculating special case handling operation of the embodiment of FIG. 5. At step 104 processing waits until special case handling is triggered. Step 106 determines whether the operand within lane 80 is marked as requiring special case processing. If the operand in lane 80 is not so marked, then processing proceeds to step 108. Step 108 determines whether or not any more marked operands have yet to be subject to special case processing. If there are no such further marked operands requiring special case processing, then processing proceeds to step 100 where the operands from the accumulation registers are transferred into the result registers and the special case handling processing is terminated. If the determination at step 108 is that there are further marked operands to be processed, then step 112 permutes the next marked operand into lane 80 which contains the shared special case handling circuit 98 and step 114 inserts an instruction back into the top of the pipeline 72 with this permuted operand position so as to give the effect of recirculation.

Following either step 106 or step 114, step 116 serves to perform the required special case processing operations using the shared special case handling circuit 98. Step 118 then performs any necessary permutation to return the operand to its original processing lane.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for processing data having data processing pipeline hardware, said data processing pipeline hardware comprising:
   a plurality of lanes of processing circuitry configured to perform data processing operations in parallel upon operands within respective ones of said plurality of lanes of processing circuitry;
   a plurality of special case detecting circuits, each coupled to a respective one of said plurality of lanes of processing circuitry and configured to detect in parallel a respective special case condition if one or more of said operands processed by said lane of processing circuitry matches any of one or more predetermined conditions; and
   one or more shared special case handling circuits each coupled to a plurality of said plurality of special case detecting circuits and configured to perform in series a respective special case processing operation for a special case condition detected within any of a plurality of said plurality of lanes of processing circuitry, wherein said data processing pipeline hardware comprises permutation circuitry configured to swap operands between said plurality of processing lanes, each of said one or more shared special case handling circuits disposed within a respective one of said plurality of processing lanes and said permutation circuitry configured to swap operands for a processing lane in which a special case condition has been detected into one of said plurality of processing lanes having one of said one or more said shared special case handling circuits for special case processing.

2. Apparatus as claimed in claim 1, wherein said data processing pipeline hardware is single instruction multiple data processing pipeline hardware.

3. Apparatus as claimed in claim 1, wherein said operands are floating point operands.

4. Apparatus as claimed in claim 1, wherein said one or more shared special case handling circuits comprises a single shared special case handling circuit that is coupled to said plurality of special case detecting circuits and configured to perform in series a respective special case processing operation for a special case condition detected within any of said plurality of lanes of processing circuitry.

5. Apparatus as claimed in claim 1, wherein each of said one or more shared special case handling circuits is configured:
   to stall said data processing pipeline hardware when one or more special conditions are detected;
   serially to perform respective special case processing operations for said one or more special case conditions; and
   to unstall said data processing pipeline hardware when said special case processing operations are completed.

6. Apparatus as claimed in claim 5, wherein said data processing pipeline hardware comprises a plurality of registers configured to store respective operands processed by said plurality of lanes of processing circuitry, said plurality of special case detecting circuits being configured to detect said one or more special conditions within operands stored in said plurality of registers and subsets of said plurality of registers being coupled together in series to perform shift operations to provide input operands to said one or more shared special case handling circuits and to receive output operands from said one or more shared special case handling circuits.

7. Apparatus as claimed in claim 1, wherein when a special case condition is detected within one of said plurality of lanes that does not contain one or said one or more shared special case handling circuits, then a processing operation corresponding to said special case condition is input to said data processing pipeline hardware as part of a recirculation operation and said permutation circuitry swaps operands between said plurality of processing lanes such that one or said one or more shared special case handling circuits can perform said special case processing operation for said special case condition.

8. Apparatus as claimed in claim 7, wherein said data processing pipeline hardware comprises a plurality of accumulation registers configured to store any operands in which no special case condition has been detected and operands output from said special case processing until recirculation operations corresponding to all detected parallel special case conditions have completed.

9. Apparatus as claimed in claim 8, wherein said permutation circuitry is configured to swap operands back to their original one of said plurality of processing lanes when any special case processing has been performed by one or said one or more shared special case handling circuits upon said operands.

10. Apparatus as claimed in claim 8, wherein contents of said plurality of accumulation registers are moved to a plurality of result registers when recirculation operations corresponding to all detected parallel special case conditions have completed.

11. Apparatus as claimed in claim 7, wherein those processing lanes not containing any of said one or more shared special case handling circuits are held inactive during said one or more recirculation operations.

12. Apparatus as claimed in claim 3, wherein said one or more predetermined conditions comprise a floating point operand being one of:
   a denormal floating point number;
   an infinity;
   a not-a-number; and
   a floating point number requiring format conversion.

13. Apparatus for processing data having data processing pipeline means for processing data, said data processing pipeline means comprising:
   a plurality of lanes of processing means for performing data processing operations in parallel upon operands within respective ones of said plurality of lanes of processing means;
   a plurality of special case detecting means for detecting special cases, each coupled to a respective one of said plurality of lanes of processing means and configured to detect in parallel a respective special case condition if one or more of said operands processed by said lane of processing means matches any of one or more predetermined conditions; and
   one or more shared special case handling means for performing special case handling each coupled to a plurality of said plurality of special case detecting circuits and configured to perform in series a respective special case processing operation for a special case condition detected within any of a plurality of said plurality of lanes of processing means, wherein said data processing pipeline means comprises permutation circuitry configured to swap operands between said plurality of processing lanes, each of said one or more shared special case handling means disposed within a respective one of said plurality of lanes of processing means and said permutation circuitry configured to swap operands for a processing lane in which a special case condition has been detected into one of said plurality of processing lanes having one of said one or more said shared special case handling circuits for special case processing.

14. A method of processing data within data processing pipeline hardware comprising the steps of:
performing data processing operations in parallel upon operands within respective ones of a plurality of lanes of processing circuitry;
detecting in parallel a respective special case condition if one or more of said operands processed by a lane of processing circuitry matches any of one or more predetermined conditions; and
perform in series with one or more shared special case handling circuits a respective special case processing operation for a special case condition detected within any of a plurality of said plurality of lanes of processing circuitry, swapping operands for a processing lane in which a special case condition has been detected into one of said plurality of processing lanes having one of said one or more said shared special case handling circuits for special case processing, wherein when a special case condition is detected within one of said plurality of lanes that does not contain one or said one or more shared special case handling circuits, then a processing operation corresponding to said special case condition is input to said data processing pipeline hardware as part of a recirculation operation and operands are swapped between said plurality of processing lanes such that one or said one or more shared special case handling circuits can perform said special case processing operation for said special case condition.

15. A method as claimed in claim 14, wherein each of said one or more shared special case handling circuits operates:
to stall said data processing pipeline hardware when one or more special conditions are detected;
serially to perform respective special case processing operations for said one or more special case conditions; and
to unstall said data processing pipeline hardware when said special case processing operations are completed.

16. A method as claimed in claim 14, wherein said data processing pipeline hardware is single instruction multiple data processing pipeline hardware.

17. Apparatus as claimed in claim 14, wherein said operands are floating point operands.

* * * * *